(12) United States Patent
Song et al.

(10) Patent No.: US 10,691,338 B2
(45) Date of Patent: Jun. 23, 2020

(54) DATA STORAGE DEVICE AND DATA PROCESSING SYSTEM INCLUDING SAME

(71) Applicant: SAMSUNG ELECTRONICS CO., LTD., Suwon-si, Gyeonggi-Do (KR)

(72) Inventors: Sang-Sub Song, Suwon-si (KR); Chan-Ho Yoon, Seoul (KR); Nam-Wook Kang, Hwaseong-si (KR); Jung-Pil Lee, Hwaseong-si (KR); Tae-Young Lee, Incheon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1 day.

(21) Appl. No.: 15/147,924

(22) Filed: May 6, 2016

(65) Prior Publication Data

US 2016/0371012 A1 Dec. 22, 2016

(30) Foreign Application Priority Data

Jun. 22, 2015 (KR) .......................... 10-2015-0088721

(51) Int. Cl.
*G06F 3/06* (2006.01)

(52) U.S. Cl.
CPC .......... *G06F 3/0607* (2013.01); *G06F 3/0658* (2013.01); *G06F 3/0688* (2013.01)

(58) Field of Classification Search
CPC ...... G06F 3/061; G06F 3/0607; G06F 3/0656; G06F 3/0659; G06F 3/0685; G06F 3/0688; G06F 3/067

USPC .......................................... 711/103, 114, 154
See application file for complete search history.

(56) References Cited

U.S. PATENT DOCUMENTS

| | | | |
|---|---|---|---|
| 8,250,403 | B2 | 8/2012 | Lee |
| 8,285,946 | B2 | 10/2012 | Eleftheriou et al. |
| 8,631,202 | B2 | 1/2014 | Kim |
| 8,719,532 | B2 | 5/2014 | Jo et al. |
| 9,093,160 | B1* | 7/2015 | Ellis ....................... G11C 16/10 |
| 9,672,877 | B2* | 6/2017 | Seung Min ....... H01L 21/67736 |
| 2009/0063895 | A1 | 3/2009 | Smith |
| 2010/0250826 | A1 | 9/2010 | Jeddeloh |
| 2011/0087824 | A1 | 4/2011 | Lin et al. |
| 2013/0013848 | A1 | 1/2013 | Cho |
| 2013/0159608 | A1 | 6/2013 | Shin |
| 2013/0262920 | A1 | 10/2013 | Jung et al. |
| 2014/0082260 | A1* | 3/2014 | Oh ....................... G06F 13/1668 711/103 |
| 2014/0108703 | A1* | 4/2014 | Cohen ................... G06F 3/0616 711/103 |
| 2014/0215290 | A1 | 7/2014 | Frost et al. |
| 2014/0325148 | A1 | 10/2014 | Choi et al. |
| 2015/0067450 | A1* | 3/2015 | Ryu ....................... G06F 3/0619 714/773 |

(Continued)

*Primary Examiner* — Pierre Miche Bataille
(74) *Attorney, Agent, or Firm* — Volentine, Whitt & Francos, PLLC

(57) ABSTRACT

A data storage device includes a controller connected via a plurality of channels to a plurality of clusters, wherein each cluster comprises a scale-out device including a scale-out controller and a buffer. The scale-out controller is connected to a plurality of sub-channels, each one of the plurality of sub-channels connecting a group of non-volatile memory (NVM) devices, such that the scale-out controller controls execution of data processing operations directed to any one of the NVM devices and the buffer.

18 Claims, 18 Drawing Sheets

(56) References Cited

U.S. PATENT DOCUMENTS

| | | | |
|---|---|---|---|
| 2015/0248249 A1* | 9/2015 | Amidi | G06F 11/1441 711/103 |
| 2015/0248366 A1* | 9/2015 | Bergsten | H04L 67/1097 710/308 |
| 2016/0019160 A1* | 1/2016 | Mohan | G06F 12/0246 711/208 |
| 2016/0092116 A1* | 3/2016 | Liu | G11C 5/025 711/103 |
| 2016/0232088 A1* | 8/2016 | Mohan | G06F 12/0246 |

* cited by examiner

DATA STORAGE DEVICE AND DATA PROCESSING SYSTEM INCLUDING SAME

CROSS-REFERENCE TO RELATED APPLICATION

This application claims the benefit of Korean Patent Application No. 10-2015-0088721 filed on Jun. 22, 2015, the subject matter of which is hereby incorporated by reference.

BACKGROUND

The inventive concept relates to data storage devices and data processing systems including at least one data storage device. More particularly, the inventive concept relates to data storage devices having a distributed scale-out structure, as well as data processing systems including this type of data storage device.

Memory devices are used to store digital data and may be classified as volatile or non-volatile according to their operative properties. In general, non-volatile memory devices are able to retain stored data in the absence of applied power. So-called flash memory is a particular type of non-volatile memory that is capable of being electrically erased and programmed. That is, a number of constituent flash memory cells may be electrically erased during a single erase operation, or electrically programmed during a single program operation.

Various digital drives, such as Solid State Drives (Disks) or SDDs, are configured using one or more non-volatile memory devices, e.g., one or more flash memory devices. However, previous attempts to substantially expand the data storage capacity of such drives essentially required the fixed addition of more non-volatile memory devices. And as the number of non-volatile memory devices included in various drives has increased, the size of associated mapping table(s) (e.g., such as mapping tables used to convert logical addresses into physical addresses) has also increased. This manifest relationship presents a significant hurtle, as increasingly large mapping tables tend to slow the overall performance of data processing systems.

SUMMARY

Embodiments of the inventive concept provide data storage devices including a scale-out structure that may be used to easily expand the data storage capacity of memory systems without reducing data processing speed. Embodiments of the inventive concept also provides data processing systems including this type of data storage device(s).

According to an aspect of the inventive concept, there is provided a data storage device including; a controller connected via a plurality of channels to a plurality of clusters, wherein each cluster comprises a scale-out device including a scale-out controller and a buffer, the scale-out controller is connected to a plurality of sub-channels, each one of the plurality of sub-channels connecting a group of non-volatile memory (NVM) devices, such that the scale-out controller controls execution of data processing operations directed to any one of the NVM devices and the buffer.

According to another aspect of the inventive concept, there is provided a data processing system, including; a host controlling the operation of a data storage device, wherein the data storage device comprises an external buffer, and a controller connected via a plurality of channels to a plurality of clusters, wherein each cluster comprises a scale-out device including a scale-out controller and a buffer, the scale-out controller is connected to a plurality of sub-channels, each one of the plurality of sub-channels connecting a group of non-volatile memory (NVM) devices, and the scale-out controller controls execution of data processing operations directed to any one of the NVM devices and the buffer.

According to another aspect of the inventive concept, there is provided a data storage device including; a controller connected via a plurality of channels to a first cluster and a second cluster, wherein the first cluster comprises a first scale-out device including a first scale-out controller and a first buffer, the second cluster comprises a second scale-out device including a second scale-out controller and a second buffer, the first scale-out controller being connected to a first sub-channel and a second sub-channel, the first sub-channel connecting a first group of non-volatile memory (NVM) devices and the second sub-channel connecting a second group of NVM devices, such that the first scale-out controller controls execution of data processing operations directed to any one of the NVM devices connected by the first and second sub-channels and the first buffer, and the second scale-out controller being connected to a third sub-channel and a fourth sub-channel, the third sub-channel connecting a third group of NVM devices and the fourth sub-channel connecting a fourth group of NVM devices, such that the second scale-out controller controls execution of data processing operations directed to any one of the NVM devices connected by the third and fourth sub-channels and the second buffer.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1:
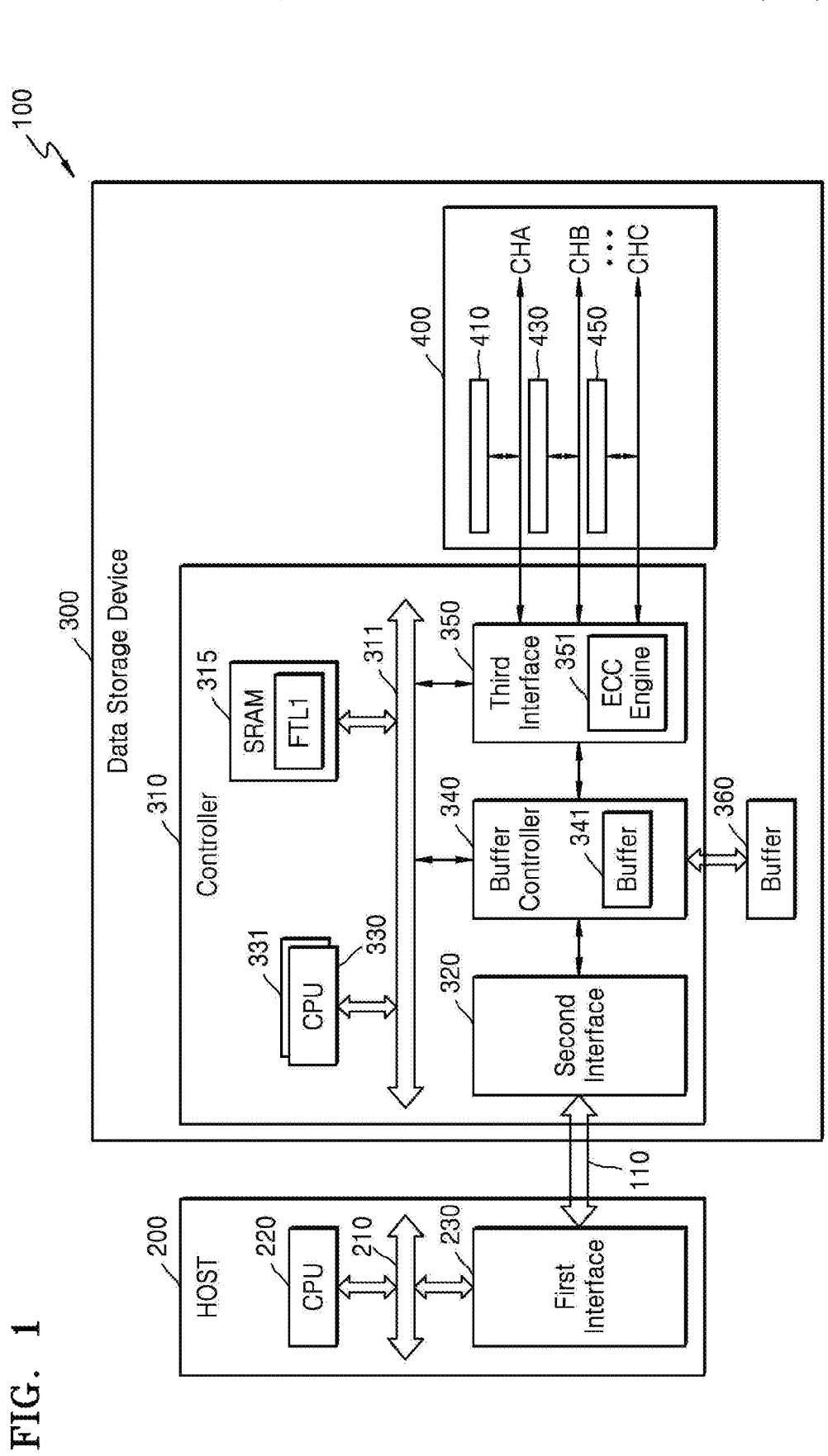
FIG. 1 is a block diagram illustrating a data processing system according to an embodiment of the inventive concept.

Embodiments of the inventive concept will now be described in some additional detail with reference to the accompanying drawings. These embodiment are provided so that this disclosure is thorough and complete and fully conveys the scope of the inventive concept to one of ordinary skilled in the art. The inventive concept may be embodied in many different forms, and should not be construed as being limited to the embodiments set forth herein.

Embodiment according to the inventive concept may be modified in various ways and take on various alternative forms, and thus, specific embodiments thereof are shown in the drawings and described in detail below as examples. However, there is no intent to limit the inventive concept to the particular forms disclosed. On the contrary, the inventive concept is to cover all modifications, equivalents, and alternatives falling within the spirit and scope of the appended claims.

It will be understood that when an element, such as a layer, a region, or a substrate, is referred to as being "on," "connected to" or "coupled to" another element, it may be directly on, connected or coupled to the other element or intervening elements may be present. On the other hand, it will be understood that when an element, such as a layer, a region, or a substrate, is referred to as being "directly on," "directly connected to" or "directly coupled to" another element, intervening elements are not present. Other expressions, such as, "between" and "directly between", describing the relationship between the constituent elements, may be construed in the same manner.

The terminology used herein is for the purpose of describing particular embodiments only and is not intended to be limiting of the inventive concept. As used herein, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless explicitly so defined herein. As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of a data processing system 100 according to an embodiment of the inventive concept.

Referring to FIG. 1, the data processing system 100 including a host 200 and a data storage device 300 that sends and/or receives commands and/or data to/from the host 200 via at least one interface 110. The data storage device 300 includes a so-called "scale-out structure", examples of which will be presented hereafter.

The data processing system 100 of FIG. 1 may be a data processing system used in, for example, a personal computer (PC), workstation, data center, internet data center, enterprise data storage system, storage area network (SAN), and/or network attached storage (NAS) unit.

The exemplary interface 110 shown in FIG. 1 may be implemented, for example, as a serial advanced technology attachment (SATA) interface, SATA express (SATAe) interface, serial attached small computer system interface (SAS), peripheral component interconnect express (PCIe) interface, non-volatile memory express (NVMe) interface, advanced host controller interface (AHCI), or some combination thereof. In various embodiments of the inventive concept, the interface 110 may transmit and/or receive (hereafter, "communicate") electrical signals and/or optical signals.

The host 200 may be used to control a data processing operation (e.g., a write (program) operation, erase operation, or read operation) executed by the data storage device 300 according to one or more commands and associated data communicated via the interface 110.

In the illustrated embodiment of FIG. 1, the host 200 includes a central processing unit (CPU) 220 and a first interface 230 connected via a bus structure (or bus) 210. The host 200 may be implemented as an integrated circuit (IC), motherboard assembly, System-on-Chip (SoC), application processor (AP), mobile AP, or database server. In one or more of these embodiment variations, the bus structure 210 may be implemented using an advanced microcontroller bus architecture (AMBA), advanced high-performance bus (AHB), an advanced peripheral bus (APB), advanced eXtensible interface (AXI), advanced system bus (ASB), or some combination thereof.

The CPU 220 may be used to generate a write request/read request defining (or controlling) a write operation/read operation executed by the data storage device 300. Here, the write request/read request includes one or more write address(es)/read address(es). In certain embodiments of the inventive concept, the CPU 220 may be a multi-core processor.

The first interface 230 may be used to change command format(s) and/or data format(s) for commands (e.g., requests and responses) and data communicated between the host 200 to the data storage device 300. Thus, the first interface 230 may include (or control the operation of) a transceiver capable of communicating commands and/or data. However, specifically configured, the structure and operation of the first interface 230 will be compatible with the structure and operation of the interface 110.

In the embodiment illustrated in FIG. 1, the data storage device 300 includes a controller 310, an external buffer 360, and a memory cluster 400. The data storage device 300 may be implemented as a flash memory-based memory device, but is not limited thereto. For example, the data storage device 300 may be implemented as a solid-state drive or solid-state disk (SSD), embedded SSD (eSSD), universal flash storage (UFS), multimedia card (MMC), or embedded MMC (eMMC). The flash memory-based memory device may implemented as a NAND-type flash memory device or NOR-type flash memory device. Further, it may be implemented to include one or more three-dimensional memory cell array(s), such as a vertical NAND-type flash memory cell array.

In certain embodiments of the inventive concept, the data storage device 300 may be implemented in a hybrid memory system along with a hard disk drive (HDD)), phase change random access memory (PRAM) device, magneto-resistive RAM (MRAM) device, spin-transfer torque MRAM (STT-MRAM) device, ferroelectric RAM (FRAM) device, or resistive RAM (RRAM) device.

The controller 310 may be used to control the communication of commands and/or data between the host 200, external buffer 360, and memory cluster 400. Here again, the controller 310 may be implemented as an IC, SoC, or other semiconductor package.

In the illustrated embodiment of FIG. 1, the controller 310 includes a bus structure (or bus) 311, an internal memory 315, a second interface 320, at least one CPU 330 and/or 331, a buffer controller 340, and a third interface 350. The controller 310 may further include an internal buffer 341 that is controlled by the buffer controller 340. In FIG. 1, although the internal buffer 341 is implemented inside the buffer controller 340, the internal buffer 341 may be implemented inside the controller 310.

The bus structure 311 may implemented according to technical specifications associated with the AMBA, AHB, APB, AXI, ASB, or some combination thereof.

The internal memory 315 may be used to store data necessary for an operation of the controller 310 and/or data generated during a data processing operation (e.g., a write/read operation) executed using the controller 310. For example, the internal memory 315 may store a first flash translation layer (FTL1) used by the at least one CPU 330 and/or 331. The internal memory 315 may alternately or additionally be used to store boot code. The boot code and/or FTL1 may be loaded from the memory cluster 400 to the internal memory 315. Those skilled in the art will understand that the internal memory 315 may be variously implemented using random access memory (RAM), dynamic RAM (DRAM), static RAM (SRAM), buffer(s), buffer memory, cache(s), tightly coupled memory (TCM), etc.

The second interface 320 may be used to change command/data format(s) for commands (e.g., requests and responses) and/or data communicated between the host 200 and the data storage device 300 (e.g., the at least one CPU 330 and/or 331 and/or the buffer controller 340). Accordingly, the second interface 320 may include (or control the operation of) a transceiver. However specifically implemented, the structure and operation of the second interface 320 will be compatible with the structure and operation of the interface 110. The second interface 320 may, for example, be implemented as an interface compatible with SATA, SATAe, SAS, PCIe, NVMe, AHCI, NAND-type flash memory systems, NOR-type flash memory systems, etc.

The one or more CPUs 330 and/or 331 may be used to control the internal memory 315, second interface 320, buffer controller 340, and third interface 350 via the bus structure 311. Each CPU 330 and 331 may include one or more cores.

For example, the CPU 330 (hereinafter, the "first CPU 330") may control inter-operation with the host 200 via the second interface 320, and the CPU 331 (hereinafter, the "second CPU 331") may control inter-operation with the memory cluster 400 via the third interface 350. One or both of the first CPU 330 and second CPU 331 may be a multi-core or multi-processing stream CPU. In certain embodiments of the inventive concept, the first CPU 330 (master) may control the operation of the second CPU 331 (slave).

The buffer controller 340 may be used to the writing of write data to, and/or the reading of rad data from the buffer 360 under the control of the first CPU 330 and/or second CPU 331. The buffer controller 340 may be referred to as a controller or a buffer manager that may control the execution of write operations and/or read operations with respect to the buffer 360. The internal buffer 341 may be implemented using one or more types of volatile memory, such as SRAM.

Once write data has been communicated from the host 200 during a write operation and temporarily stored in the external buffer 360 via the buffer controller 340, data output from the external buffer 360 may be written to the memory cluster 400 via the buffer controller 340 and the third interface 350. During a read operation, read data communicated from the memory cluster 400 may be communicated to the host 200 via the third interface 350 and the internal buffer 341.

The third interface 350 may control data processing operations (e.g., write/read operations) for the memory cluster 400 via one or more channel(s) selected from among a plurality of channels (CHA, CHB, . . . , CHC) connecting the third interface 350 with the memory cluster 400 under the control of the first CPU 330 and/or second CPU 331. Here again, the third interface 350 may be implemented as an interface compatible with SATA, SATAe, SAS, PCIe, NVMe, AHCI, NAND-type flash memory system, NOR-type flash memory system, etc.

An error correction code (ECC) engine 351 may be used to detect and/or correct error(s) included in write data to be stored in the memory cluster 400 and/or read data output from the memory cluster 400. Although the ECC engine 351 is illustrated in FIG. 1 as being implemented within the third interface 350, this need not always be the case and the ECC engine 351 may be implemented external to the controller 310 in other embodiments of the inventive concept.

The buffer controller 340 may be used to write data into the external buffer 360 or read data from the external buffer 360, and may be implemented using volatile memory such as RAM, SRAM, DRAM, a buffer memory, etc. The external buffer 360 may include a first region that stores one or more mapping table(s) used, for example, to convert between logical and physical addresses with respect to a plurality of clusters 410, 430, . . . , 450. The external buffer 360 may also include a second region functioning as a data processing cache.

In certain embodiments wherein the controller 310 and external buffer 360 are separately implemented on different semiconductor chips, the different semiconductor chips may be commonly packaged using techniques such as package-on-package (PoP), multi-chip package (MCP), or system-in package (SiP). For example, a first chip including the external buffer 360 may be stacked on a second chip including the controller 310 using a ball and pad packaging technique.

The memory cluster 400 illustrated in FIG. 1 includes multiple clusters (e.g., 410, 430, . . . , 450). One or more of the multiple clusters may be operatively associated with one or more of the plurality of channels. For example, a first cluster 410 may be connected to a first channel CHA, a second cluster 430 may be connected to a second channel CHB, and a third cluster 450 may be connected to a third channel CHC. Alternately, one or more of the first cluster 410, second cluster 430 and third cluster 450 may be connected to two or more of the first channel CHA, second channel CHB and/or third channel CHC. In this context, the term "channel" denotes an independent data path that exists between the controller 310 and at least one of the clusters. Respective channels (or data paths) may include multiple bus(es) and/or signal line(s) and may share, or have exclusive access, to various bus(es), signal line(s), input/output (I/O) circuitry, etc.

The term "way" is used to denote a group of one or more non-volatile memories that share (temporarily or permanently) a same channel and are capable of communicating commands and/or data via the same channel. Accordingly, one or more ways may be configured in relation to a single channel, or in relation to multiple channels. Examples of possible structures and operations for each one of the plurality of clusters 410, 430, . . . , 450 will be described in some additional detail hereafter.

Figure 2:
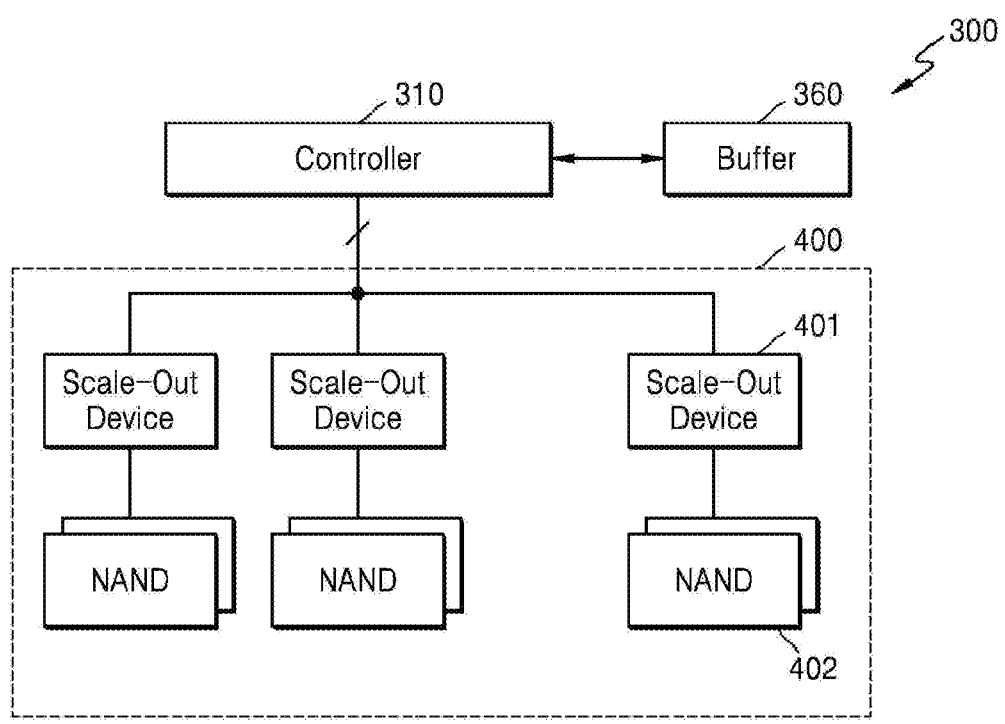
FIG. 2 is a detailed block diagram of a data storage device illustrated in FIG. 1, according to an embodiment.

FIG. 2 is a block diagram further illustrating in one example the data storage device 300 of FIG. 1 according to an embodiment of the inventive concept.

Referring to FIG. 2, a single, exemplary memory cluster 400 is assumed to include a number of individual scale-out devices 401, respectively associated with (e.g., operatively connected to) non-volatile memory devices 402 (e.g., NAND flash memory devices or non-volatile memory packages). Hereafter, one or more non-volatile memory devices may be denoted simply as "NVM devices" for the sake of brevity. Each of the scale-out devices 401 may be respectively and selectively connected to one or more channel(s) among a plurality of channels.

As an example, when the controller 310 is assumed to supports 'A' channels connected according to 'B' ways ('A' and 'B' being natural numbers greater than 1), a resulting number of scale-out devices 401 may be specified as (A*B). More specifically, if it is assumed that 'A' and 'B' are both equal to 8, the resulting number of scale-out devices 401 included in the memory cluster 400 may be specified as 64.

In certain embodiments of the inventive concept, at least one of the scale-out devices 401 illustrated in FIG. 2 may have a structure that is expandable to 'C' channels connected according to 'D' ways ('C' and 'D' being natural numbers greater than 1 and respectively greater than 'A' and 'B'). This scale-device expandability may be used, for example, to support a high speed-volatile memory interface function for storing logical address-physical address mapping information for non-volatile memory devices expanded to (C*D). In this regard, each of the scale-out devices 401 may include a buffer (e.g., a DRAM) to support the high speed-volatile memory interface function.

Figure 3A:
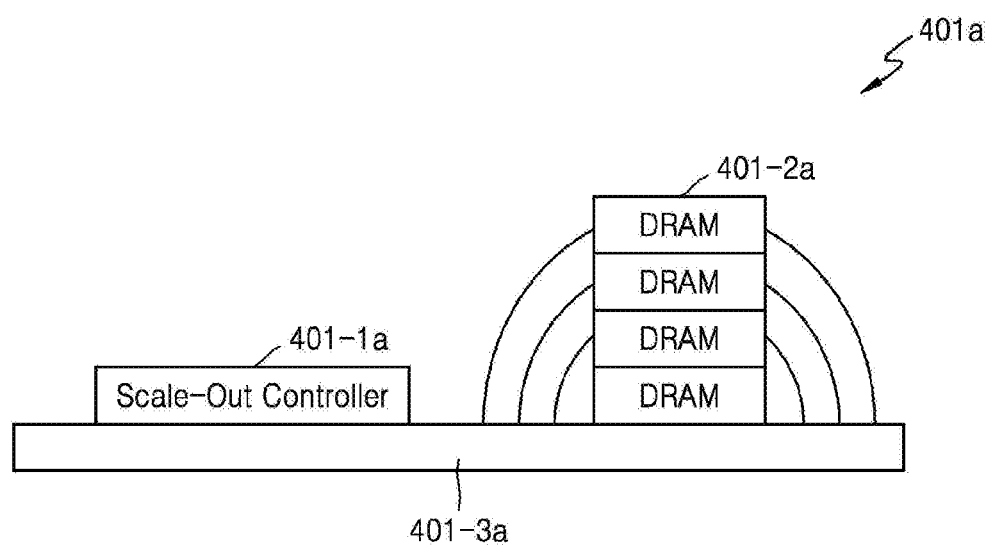
FIGS. 3A, 3B and 3C are respective block diagrams further illustrating examples of a scale-out device that may be incorporated in the data storage device of FIG. 2, according to various embodiments of the inventive concept.

FIG. 3A is a block diagram further illustrating a scale-out device 401a that may be used in the data storage device of FIG. 2, according to an embodiment of the inventive concept.

The scale-out device 401a includes a scale-out controller chip 401-1a provided on a semiconductor substrate 401-3a along with an arrangement of one or more buffer chips 401-2a. The scale-out device 401a may be implemented as a multi-chip package (MCP) in certain embodiments, and the buffer chips 401-2a may be DRAM chips, where the respective DRAM chips are provided in a "vertically" stacked structure relative to the "horizontally" extending semiconductor substrate 401-3a. In the illustrated embodiment of FIG. 3A, each of the DRAM chips may communicate data with the scale-out controller chip 401-1a via one or more corresponding bonding wires.

Figure 3B:
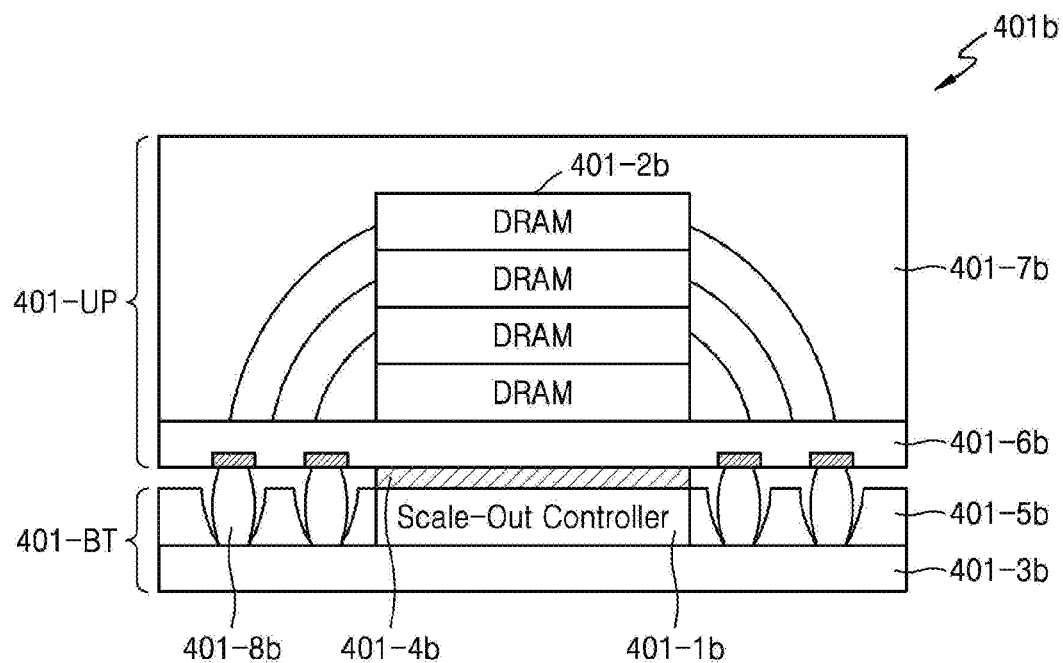

FIG. 3B is a block diagram further illustrating a scale-out device 401b that may be used in the data storage device of FIG. 2 according to another embodiment of the inventive concept.

Referring to FIG. 3B, the scale-out device 401b includes a lower package 401-BT and an upper package 401-UP. The lower package 401-BT includes a lower package substrate 401-3b, a scale-out controller chip 401-1b mounted on the lower package substrate 401-3b, and a lower mold layer 401-5b that covers the lower package substrate 401-3b and the scale-out controller chip 401-1b. The upper package 401-UP includes an upper package substrate 401-6b, one or more buffer chips 401-2b mounted on the upper package substrate 401-6b, and an upper mold layer 401-7b that covers the upper package substrate 401-6b and the one or more buffer chips 401-2b. In addition, a boundary material layer 401-4b exists between the scale-out controller chip 401-1b and an upper package base 401-6b, and the lower package 401-BT and the upper package 401-UP are electrically connected to each other via connection solder bumps 401-8b.

In this manner, the scale-out device 401b may be implemented using a PoP technique. Here again, the buffer chips 401-2b may be DRAM chips disposed in a vertical stack structure, where each of the DRAM chips communicates data with the scale-out controller chip 401-1b via one or more corresponding bonding wires.

Figure 3C:
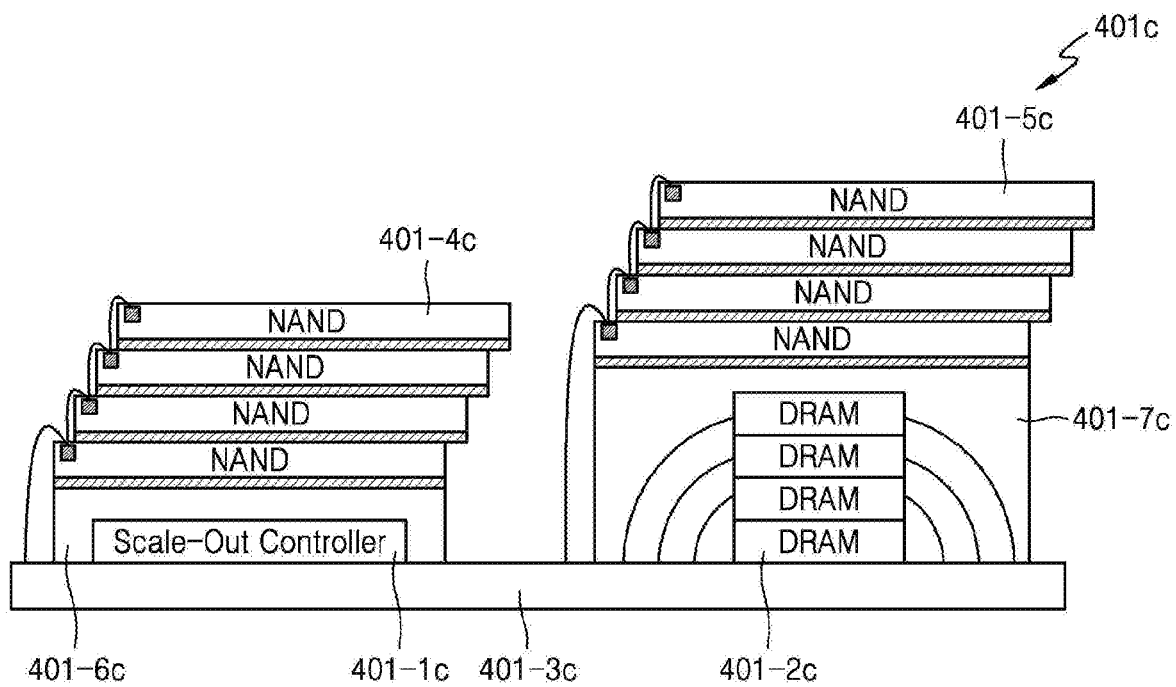

FIG. 3C is a block diagram further illustrating a cluster 401c that may be used in the data storage device of FIG. 2 according to another embodiment of the inventive concept.

The scale-out device 401c is similar to the scale-out device 401a of FIG. 3A, except multiple sets of NAND flash memory devices are shown connected in relation to a semiconductor substrate 401-3c. A first set of NAND flash memory devices 401-4c is vertically stacked above a scale-out controller 401-1c and a second set of NAND flash memory deices 401-5c is vertically stacked above the stack of buffer chips 401-2c.

Figure 4:
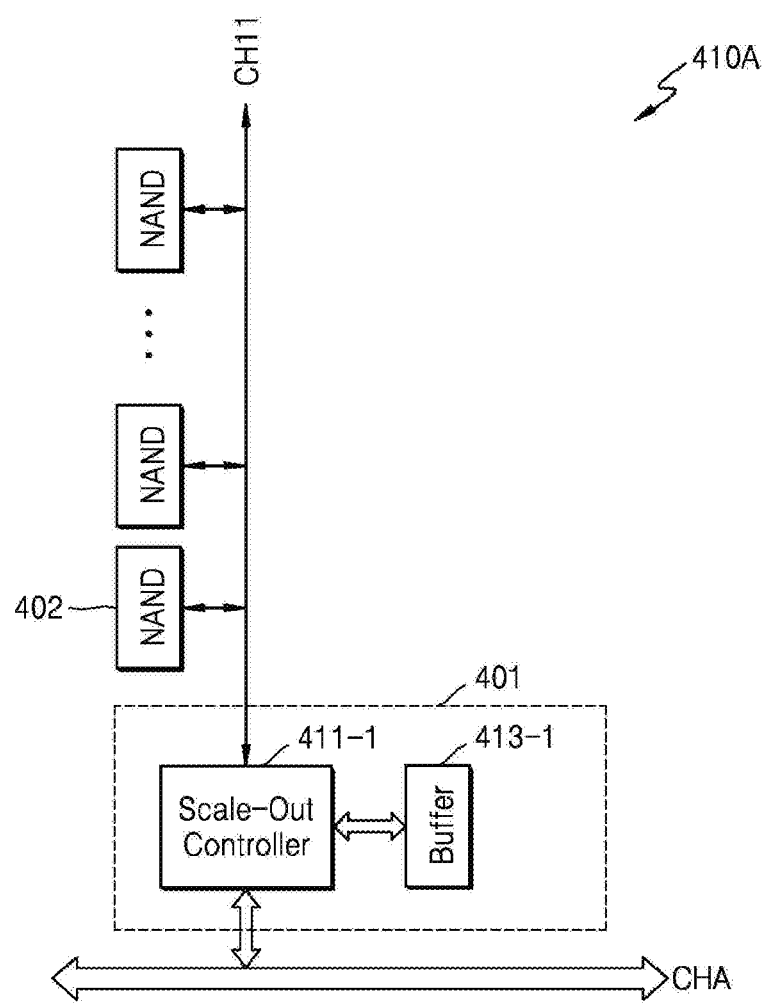
FIGS. 4, 5, 6A, 6B, 7A, 7B, 8, 9, 10 11 and 12 are respective block diagrams illustrating in various examples one or more clusters that may be incorporated into a data storage device or data processing system according to embodiments of the inventive concept.

FIG. 4 is a block diagram further illustrating in one example a first cluster 410A connected to the first channel CHA of the data storage device 300 of FIG. 1 according to an embodiment of the inventive concept.

Referring to FIGS. 1 and 4, the respective structure and operation of the first, second and third clusters 410, 430, and 450 are assumed to be substantially similar. Thus, the structure and operation of the first cluster 410A are described as an example of the other clusters.

Here, the first cluster 410A includes the scale-out device 401 connected between the first channel CHA and a plurality of non-volatile memory devices 402. The scale-out device 401 includes a scale-out controller 411-1 and a buffer (e.g. a volatile memory such as a DRAM or SRAM) 413-1, where the scale-out controller 411-1 is connected between the first channel CHA and a first sub-channel CH11 connecting the non-volatile memory devices 402. The scale-out controller 411-1 controls the operation of the buffer 413-1, as well as the respective operation of the non-volatile memory devices 402. In certain embodiments of the inventive concept, the scale-out controller 411-1 includes one or more host interface(s) capable of connecting the first cluster 410A with the controller 310 via at least the first channel CHA.

Each of the non-volatile memory devices 402 may be implemented with a PRAM device, MRAM device, STT-MRAM device, FRAM device, or RRAM device. However, in the illustrated embodiments it is assumed that the respective non-volatile memory devices 402 are NAND-type flash memories (NAND).

The NAND-type flash memory may be a die, chip die, chip, or package. The NAND-type flash memory include a memory cell array including a plurality of memory cells as well as access control circuitry that controls the execution of various data processing operations (e.g., read, write and erase operations). Each of the plurality of memory cells may be a single-level cell (SLC) configured to store binary data or a multi-level cell (MLC) configured to store two or more bits of data. Further, the constituent memory cell array(s) may be arranged two-dimensionally or three-dimensionally (e.g., vertical NAND-type flash memory cells).

The first sub-channel CH11 is an independent data path with respect to the first channel CHA and connects the scale-out controller 411-1 with each one of the NAND-type flash memories 402. Accordingly, one or more way(s) may be defined as one or more group(s) of the NAND-type flash memories 402 that share the first sub-channel CH11. With this arrangement, the scale-out controller 411-1 may independently control execution of data processing operations directed to memory cells in one or more of the NAND-type flash memories 402, and/or data processing operations directed to data stored in the buffer 413-1.

According to certain embodiments of the inventive concept, the buffer 413-1 may include a defined first memory region used to store logical address-to-physical address mapping information (e.g., one or more mapping table(s) or data structure(s), hereafter singularly or collectively referred to as "mapping table") associated with the NAND-type flash memories 402 connected to the sub-channel CH11. The buffer 413-1 may further include a defined second memory region (or cache region) used to temporarily store write data to be written to at least one of the NAND-type flash memories 402 or read data retrieved from at least one of the NAND-type flash memories 402.

Figure 5:
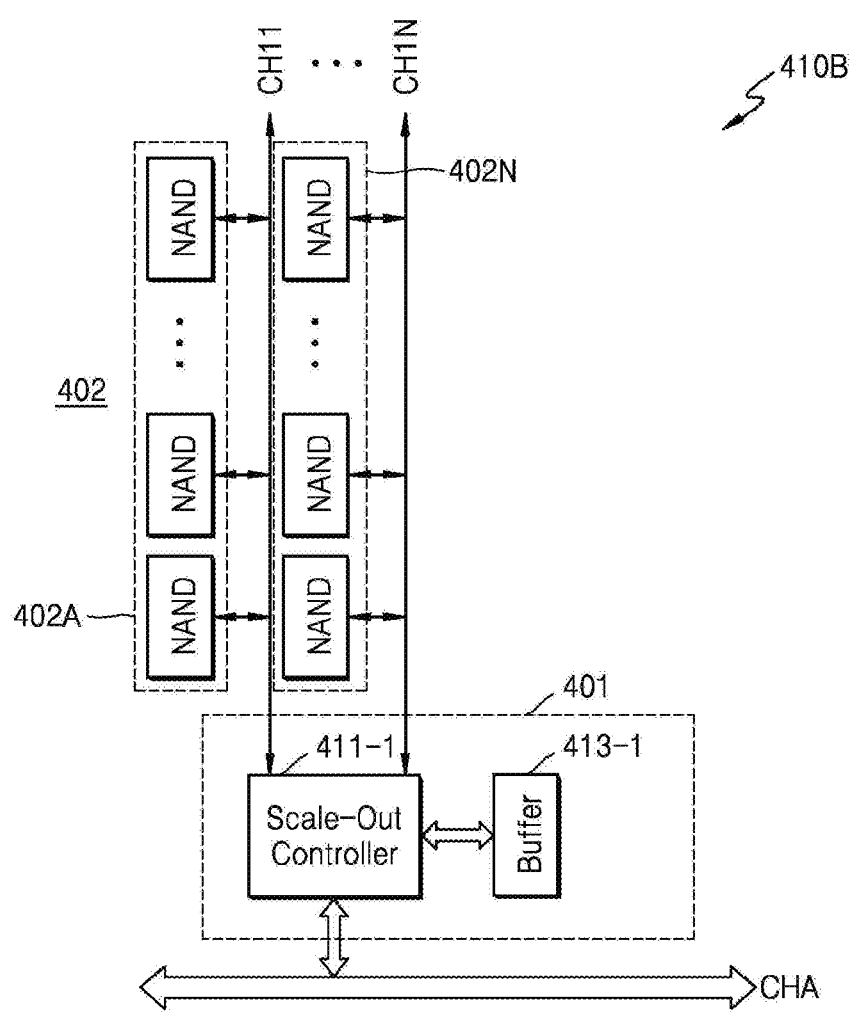

FIG. 5 is a block diagram further illustrating in another example a first cluster 410B connected to the first channel CHA of the data storage device 300 of FIG. 1 according to an embodiment of the inventive concept. Referring to FIGS. 1 and 5, the structure and operation of the first, second and third clusters 410, 430, and 450 are again assumed to be substantially similar.

The first cluster 410B again includes the scale-out device 401 connected between the first channel CHA and a plurality of non-volatile memory devices 402, where the scale-out device 401 includes the scale-out controller 411-1 and the buffer 413-1. However, the plurality of non-volatile memory devices is now connected to the scale-out device 401 via a plurality of sub-channels CH11 to CH1N, where 'N' is an integer greater than 1.

The scale-out controller 411-1 controls operation of the buffer 413-1, as well as the respective operation of the non-volatile memory devices 402 (e.g., NAND-type flash memories) connected to the sub-channels CH11 to CH1N. The scale-out controller 411-1 may include a plurality of host interfaces to connect with the plurality of channels CHA to CHC of the controller 310. Accordingly, the scale-out controller 411-1 may be variously connected to the plurality of channels CHA to CHC of the controller 310 via the plurality of host interfaces.

NAND-type flash memories in a first group 402A are connected via the first sub-channel CH11, and NAND-type flash memories in a last (or Nth) group are connected via a last or Nth sub-channel CH1N. Various ways may be connected among the various sub-channels CH11 to CH1N as previously described.

With this arrangement, the scale-out controller 411-1 may independently control data processing operations directed to memory cells of the NAND-type flash memories 402 connected via respective sub-channel CH11 to CH1N, as well as data processing operations directed to data stored in the buffer 413-1.

As before the buffer 413-1 may include a first memory region storing a logical address-to-physical address mapping table for the NAND-type flash memories 402 connected to each sub-channel CH11 to CH1N, as well as a cache region temporarily storing write data and/or read data.

Figure 6A:
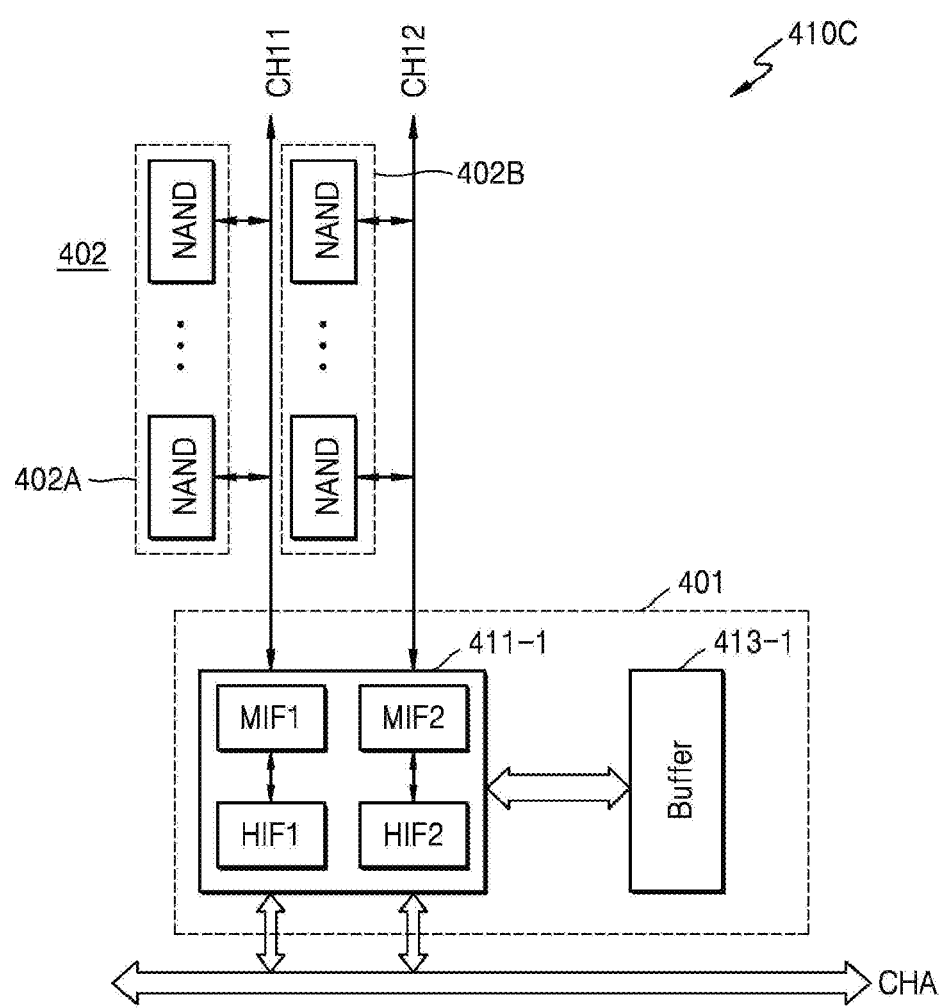

FIG. 6A is a block diagram further illustrating in another example a first cluster 410C connected to the first channel CHA of the data storage device 300 of FIG. 1 according to an embodiment of the inventive concept.

Referring to FIGS. 1, 5 and 6A, the first cluster 410C is substantially similar to that of first cluster 410B of FIG. 5, except only two (2) sub-channels are shown (first sub-channel CH11 and second sub-channel CH12) and the scale-out device 401 is further illustrated. In this regard, the scale-out controller 411-1 illustrated in FIG. 6A includes a first memory interface MIF1 connecting the first sub-channel CH11, and a second memory interface MIF2 connecting the second sub-channel CH2. The scale-out controller 411-1 also includes a first host interface HIF1 and a second host interface HIF2 respectively connected to at least one of the plurality of channels CHA to CHC and to the controller 310.

Assuming for the sake of simplicity that the first host interface HIF1 and second host interface HIF2 are each connected to the first channel CHA, the scale-out controller 411-1 may match the first host interface HIF1 to the first memory interface MIF1 and the second host interface HIF2 to the second memory interface MIF2. With this configuration, the scale-out controller 411-1 may control operations executed by the NAND-type flash memories in response to a command received from the controller 310.

For example, the scale-out controller 411-1 may control the first group of NAND-type flash memories 402A connected to the first sub-channel H11, via the first memory interface MIF1 in response to a command and/or data (hereafter, singularly or collectively "command/data") received via the first host interface HIF1. Similarly, the scale-out controller 411-1 may control a second group of NAND-type flash memories 402B connected to the second sub-channel CH12, via the second memory interface MIF2 in response to a command and/or data received via the second host interface HIF2. Accordingly, the scale-out controller 411-1 may effectively control command(s) and/or data communicated between the controller 310, buffer 413-1, and the NAND-type flash memories 402. Of note, the scale-out controller 411-1 may include only a single memory interface (MIF) configured to be selectively connected to one or more of the sub-channels.

Figure 6B:
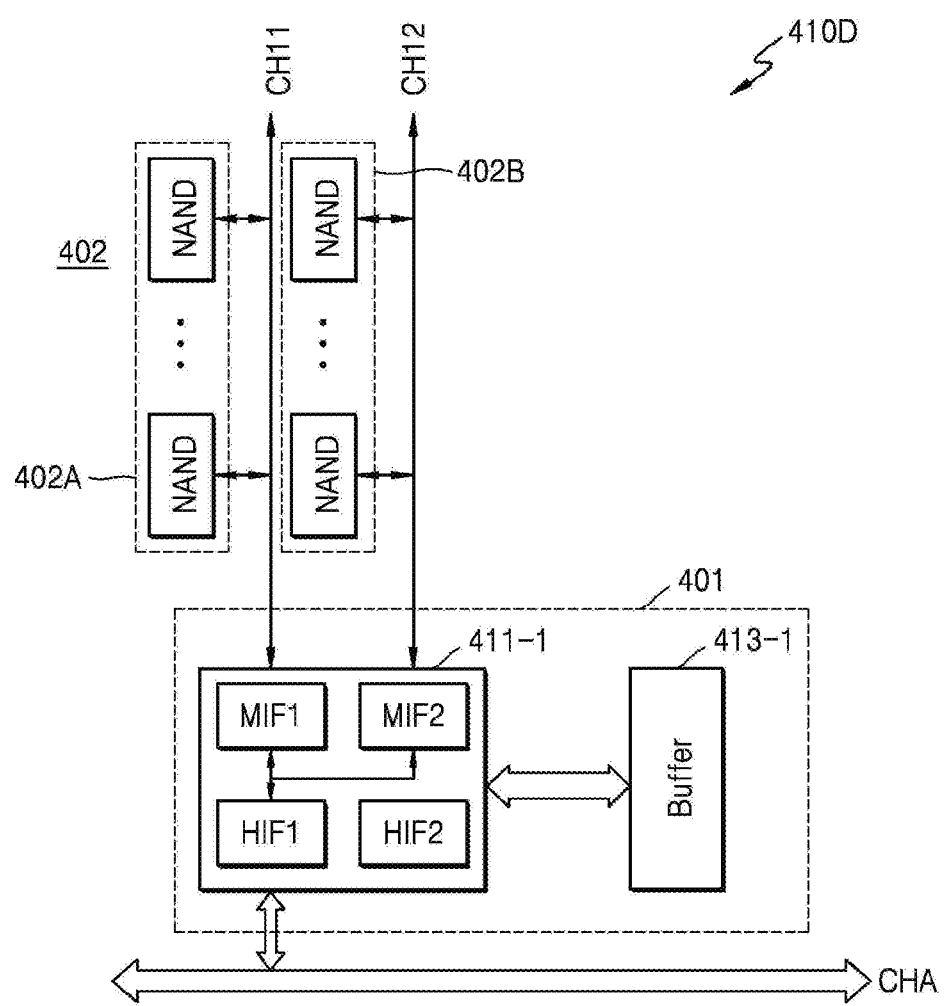

FIG. 6B is a block diagram further illustrating in another example a first cluster 410D connected to the first channel CHA of the data storage device 300 of FIG. 1 according to an embodiment of the inventive concept.

Referring to FIGS. 1, 6A and 6B, the first cluster 410D is substantially similar to that of the first cluster 410C of FIG. 6A, except for the illustrated internal connectivity of the scale-out controller 411-1.

Various embodiments of the inventive concept contemplate the selective and dynamic connectivity between one or more host interfaces (HIF) and one or more memory interfaces (MIF). Accordingly, any reasonable number of host interfaces (HIF) and memory interfaces (HIF) might be used in a competent scale-out controller 411-1. For example, multiple memory interfaces (MIF1 and MIF2) connecting respective sub-channels CH11 and CH12 might receive command(s) and/or data from a single host interface (e.g., HIF1) connected to the first channel CHA. In such a case, only the first host interface HIF1 included in the scale-out controller 411-1 is connected to the first channel CHA via one data path, as shown in FIG. 6B. Such a configuration may improve a data loading speed, as compared with the case in which the first and second host interfaces HIF1 and HIF2 included in the scale-out controller 411-1 are connected to the first channel CHA via two data paths, as shown in FIG. 6A. This is because both the first host interface HIF1 and the second host interface HIF2 that are connected to the first channel CHA may operate as load, based on the controller 310. Accordingly, a high capacity product for an optimized operating speed may have a structure in which any one of the first and second host interfaces HIF1 and HIF2 is selectively connected to one or more of the plurality of channels CHA, CHB . . . CHC.

Figure 7A:
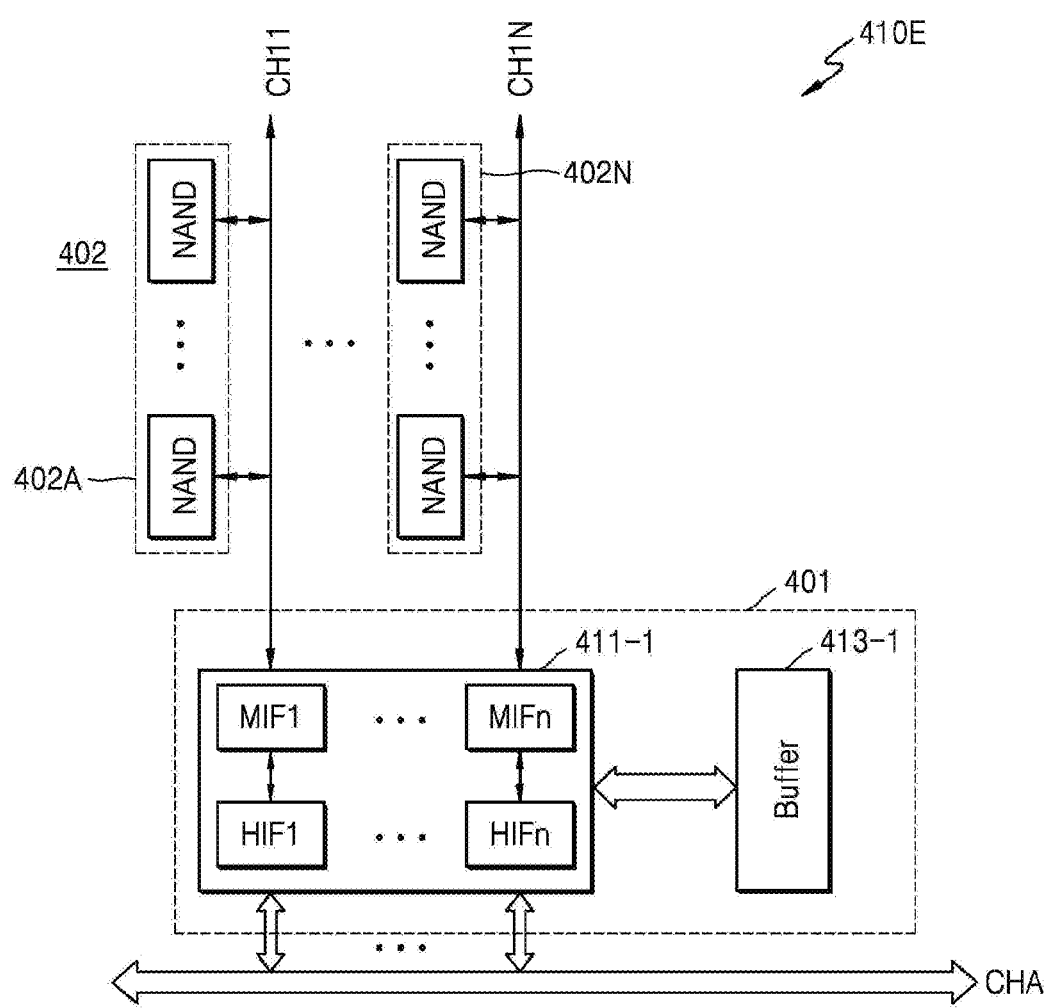
Figure 7B:
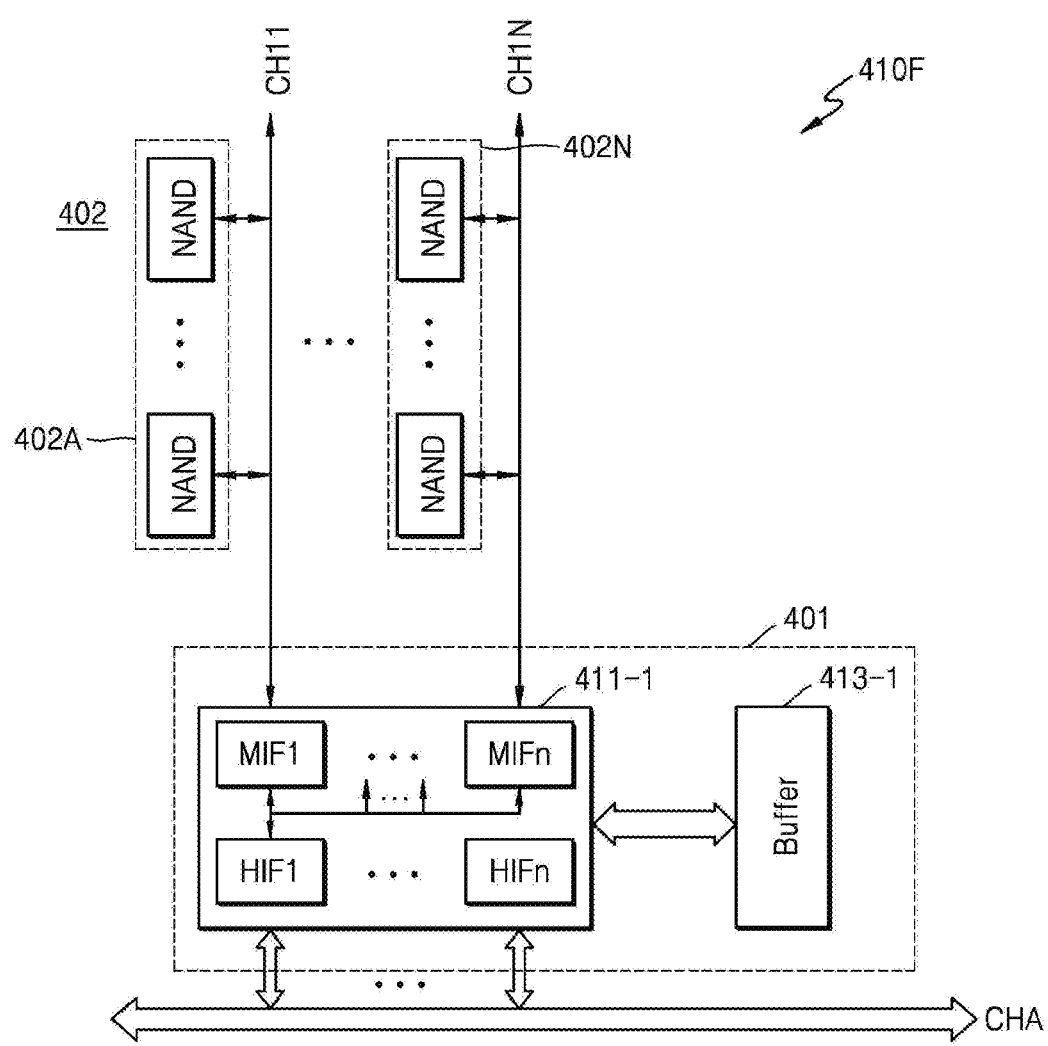

FIGS. 7A and 7B are respective block diagrams illustrating first clusters 410E and 410F connected to the first channel CHA of the data storage device 300 of FIG. 1 according to embodiments of the inventive concept.

Here, multiple sub-channels CH11 through CH1N respectively connecting various groups 402A through 402N of non-volatile memory devices 402 may be connected through the scale-out controller 411-1 using different combinations of memory interfaces MIF1 through MIFn and host interfaces HIF1 through HIFn. In this manner, the scale-out controller 411-1 may be variously configured to provide connectivity to the first channel CHA. That is, unique one-for-one relationships may be defined between a sub-channel, memory interface and host interface. Alternately, one or more host interface(s) (e.g., HIF1) might be connected to more than one memory interfaces (two or more of MIF1 through MIFn). Considering FIG. 7B in relation to FIG. 7A, the first host interface HIF1 is connected to the first channel CHA, but the remaining host interfaces HIF2 to HIFn other than the first host interface HIF1 are not connected to the first channel CHA. Yet, one or more of the sub-channels CH11 through CH1N may be selected and connected to the first channel CHA.

Where embodiments of the inventive concept are applied to high capacity products seeking to optimize operating speed, at least one—but not necessarily all—of the plurality of host interfaces HIF1 through HIFn will be selectively connected to the first channel CHA.

Figure 8:
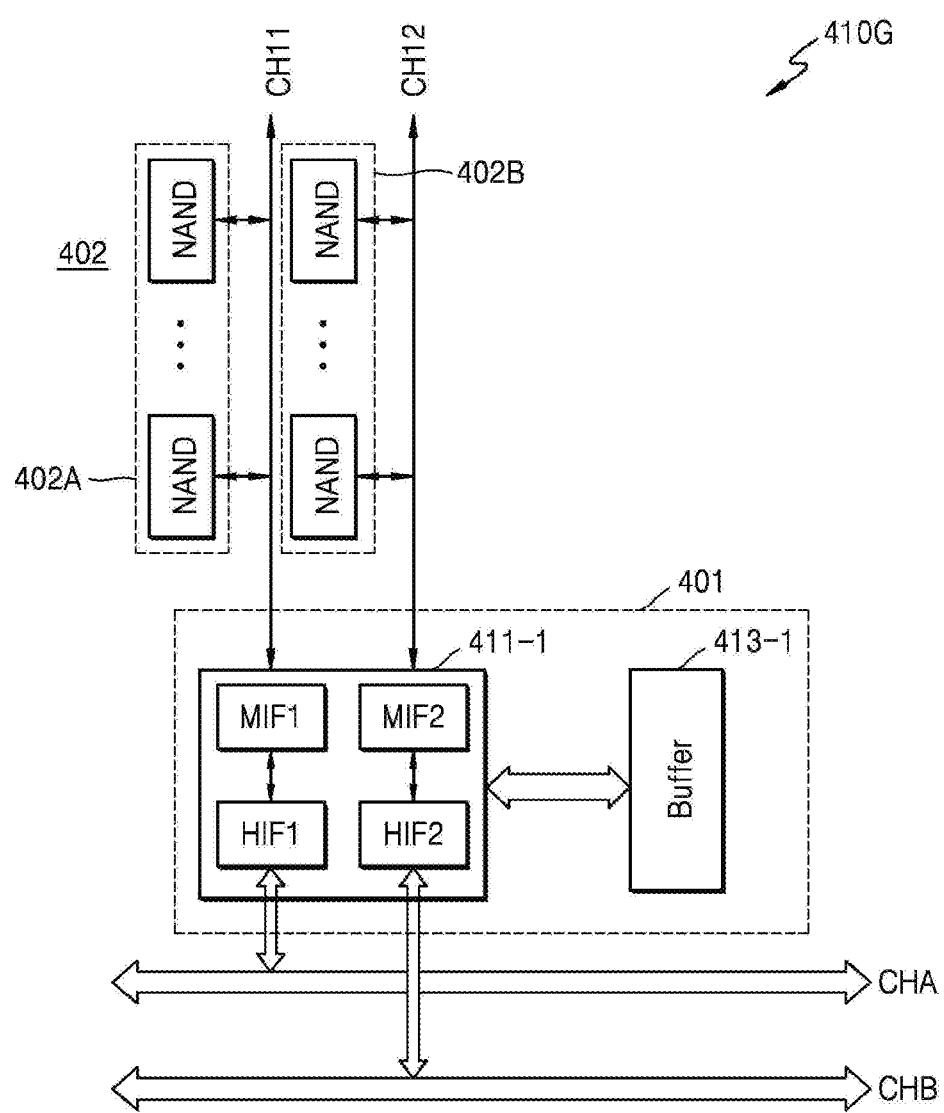

FIG. 8 is a block diagram further illustrating in another example a first cluster 410G connected to at least one of first channel CHA and second channel CHB of the data storage device 300 of FIG. 1 according to embodiments of the inventive concept.

Referring to FIGS. 1 and 8, the first cluster 410G includes the scale-out device 401 connected between first and second channels CHA and CHB and the plurality of non-volatile memory devices 402.

The scale-out controller 411-1 is connected to the first channel CHA, second channel CHB, first sub-channel CH11, second sub-channel CH12, and the buffer 413-1. The scale-out controller 411-1 may be used to control operation of the buffer 413-1 and operation of the non-volatile memory devices 402 (i.e., NAND-type flash memories) connected to the first and second sub-channels CH11 and CH12. For example, the first group of NAND-type flash memories 402A is connected to the first sub-channel CH11, and a second group of NAND-type flash memories 402B is connected to the second sub-channel CH12. The scale-out controller 411-1 includes the first memory interface MIF1 connected to the first sub-channel CH1, and second memory interface MIF2 connected to the second sub-channel CH2.

In the illustrated example of FIG. 8, the scale-out controller 411-1 also includes the first host interface HIF1 and second host interface HIF2 respectively connected to the first channel CHA and second channel CHB. Thus, since the scale-out device 401 is connected to multiple channels, the constituent data storage device will exhibit improved operating speed.

Figure 9:
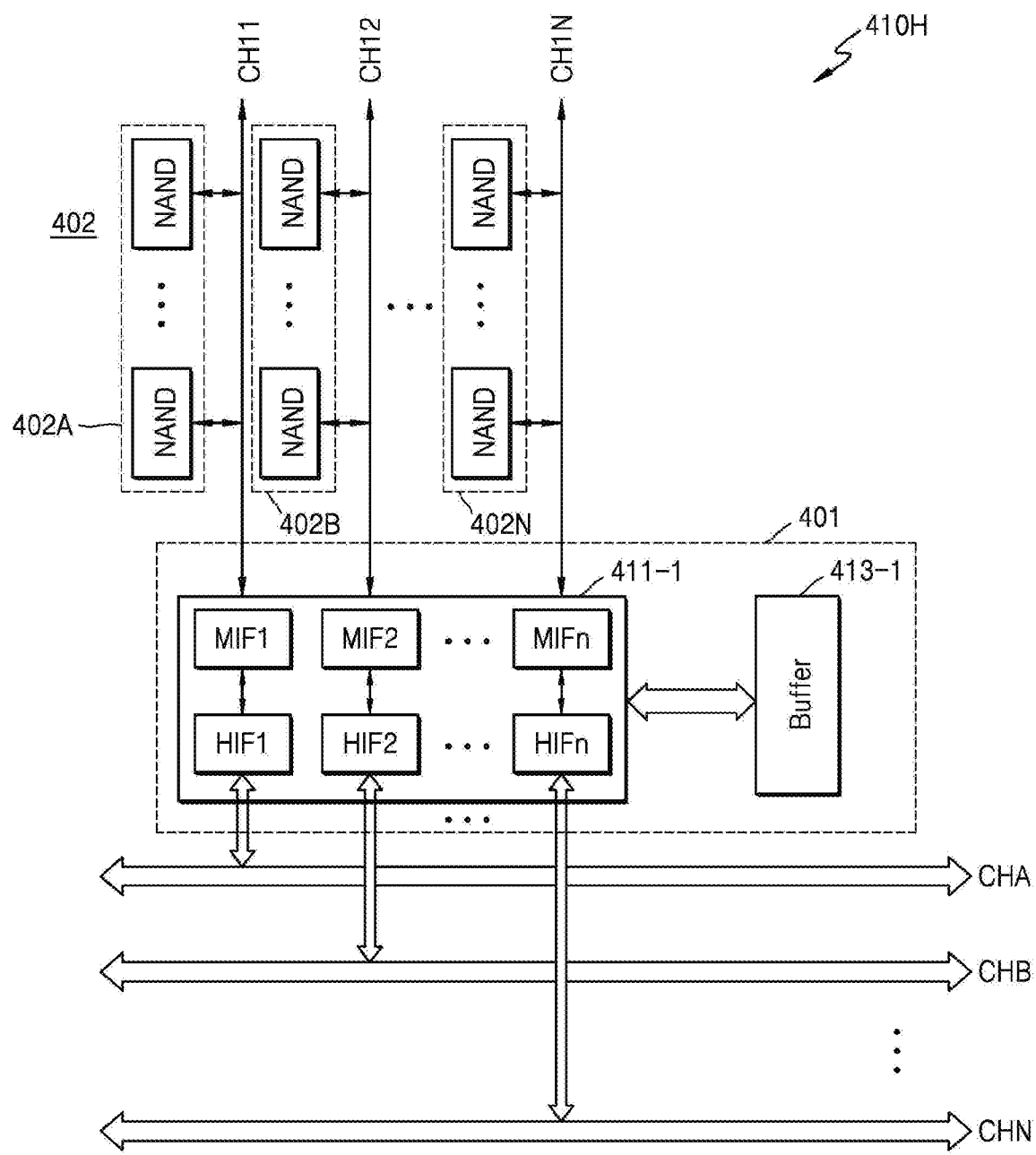

FIG. 9 is a block diagram further illustrating in another example a first cluster 410H connected to first through Nth channel (CHA . . . CHN) of the data storage device 300 of FIG. 1 according to an embodiment of the inventive concept.

Referring to FIGS. 1 and 9, the first cluster 410H includes the scale-out device 401 connected between first through Nth channels and first through Nth sub-channels (CH11 . . . CH1N) respectively connecting first through Nth groups of non-volatile memory devices 402 (e.g., 402A . . . 402N). Here again, the scale-out device 401 includes the scale-out controller 411-1 and buffer 413-1.

The scale-out controller 411-1 of FIG. 9 includes first through Nth host interfaces (HIF1 . . . HIFn) that may be variously connected via one or more of the plurality of channels of the controller 310. As shown in FIG. 9, each host interface HIF may be uniquely connected to a selected channel among the plurality of channels. However, the number of sub-channels may be different than the number of host interfaces and/or the number of channels. However specifically configured, at least one of the plurality of host interfaces HIF1 to HIFn may be selected, and only selected host interface(s) will then be connected to at least one of the plurality of channels. As the scale-out device 401 is connected to the plurality of channels, a data storage device incorporating the embodiment illustrated in FIG. 9 will exhibit improved operating speed. As previously described, corresponding groups of non-volatile memory devices (e.g., 402A . . . 402N) may be variously connected to each one of the plurality of sub-channels.

Figure 10:
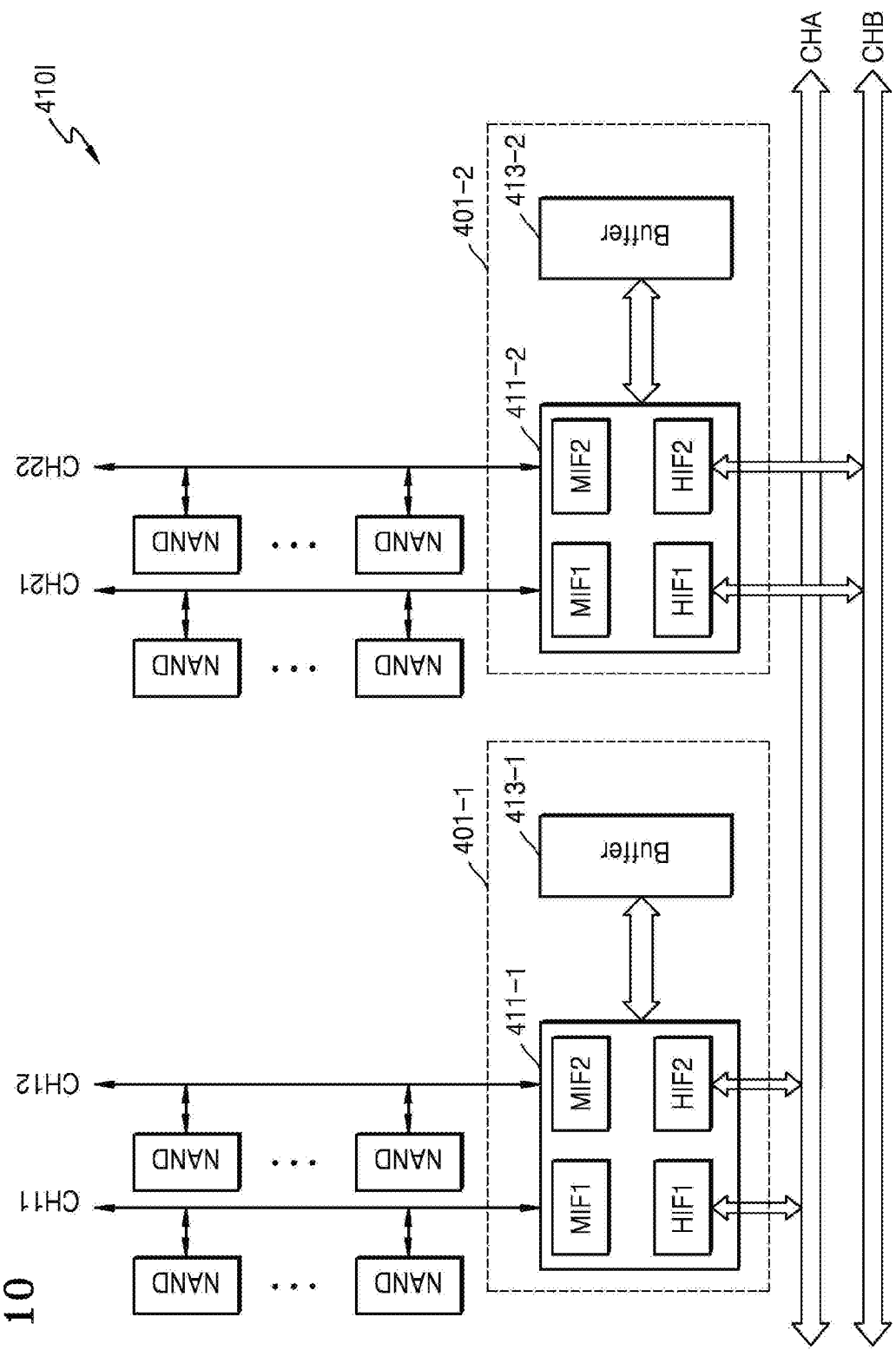
Figure 11:
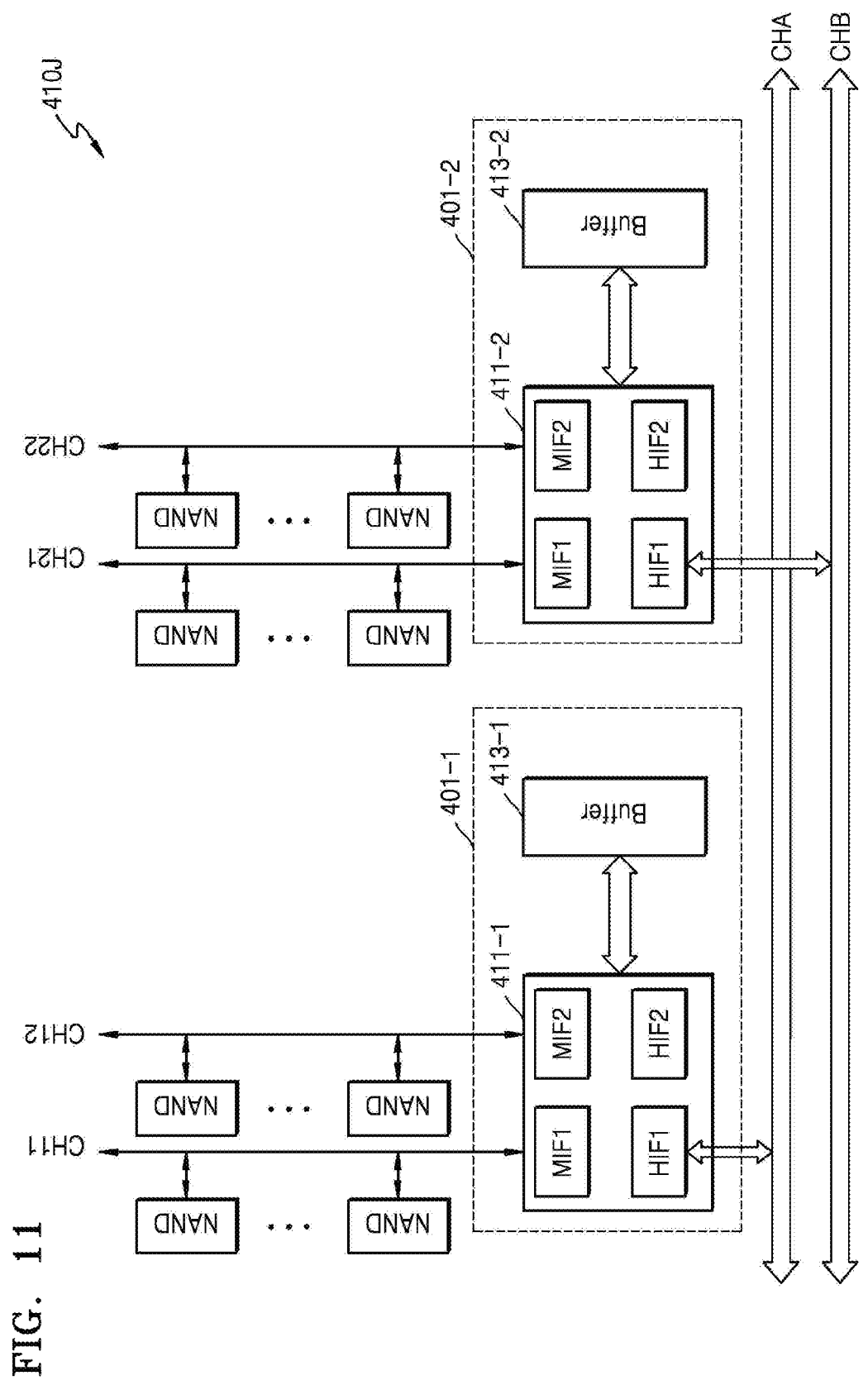
Figure 12:
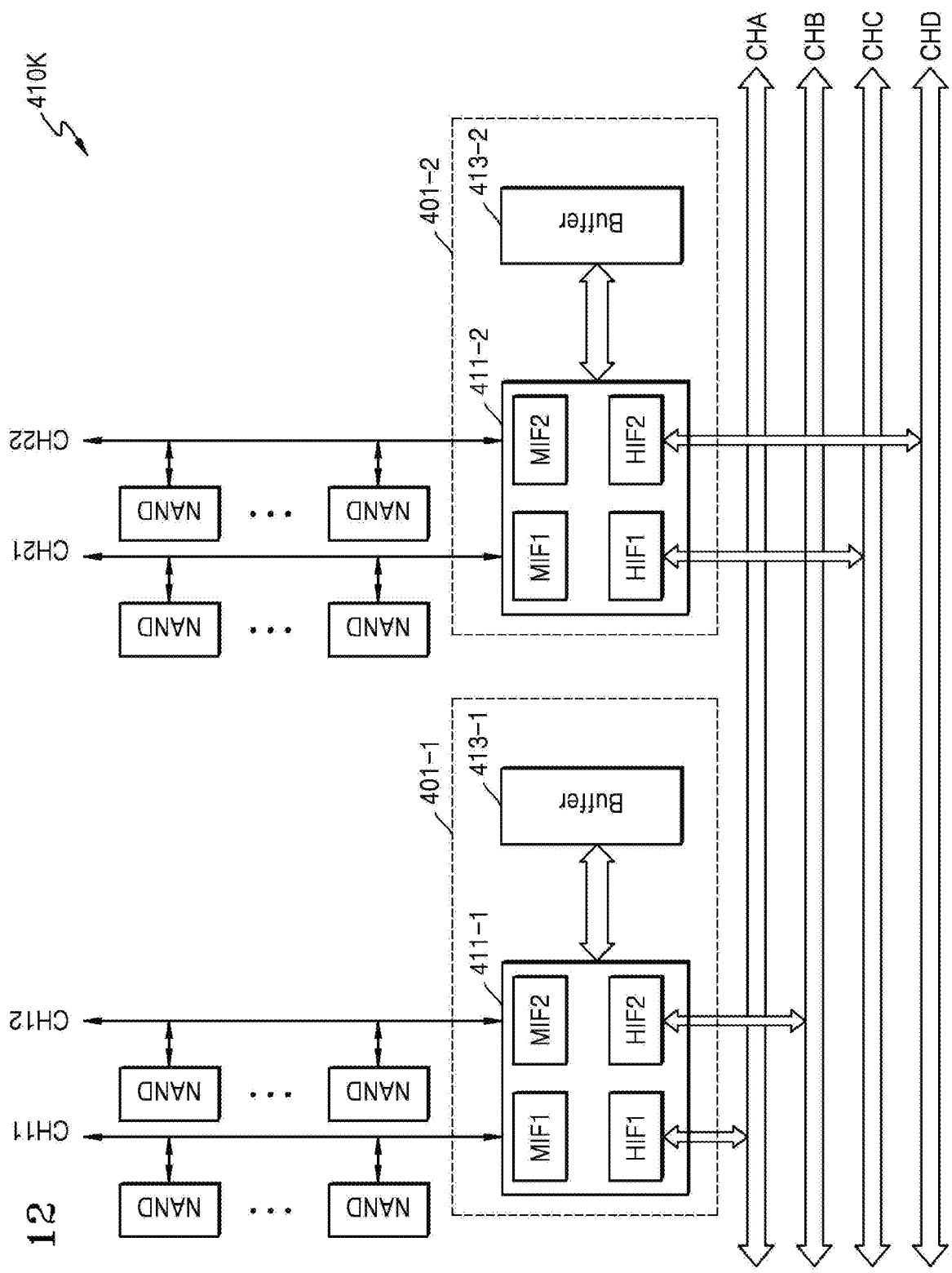

FIGS. 10, 11 and 12 are respective block diagrams illustrating a first cluster (410I, 410J and 410K) that may be connected to one or more of the plurality of channels of the data storage device 300 of FIG. 1 according to certain embodiments of the inventive concept.

Referring to FIGS. 1, 10, 11 and 12 the illustrated structures and described operations of the first through third clusters 410, 430 first clusters may function as any one of these first through thirds clusters 410, 430 and 450.

Each first cluster (410I, 410J and 410K) includes scale-out devices 401-1 and 401-2 that are variously connected between one or more of a plurality of channels and a plurality of sub-channels respectively connecting non-volatile memory devices (e.g., NAND-type flash memory devices).

In FIG. 10, the first cluster 410I includes a first scale-out controller 411-1 connected between a first channel CHA and first and second sub-channels CH11 and CH12. The first cluster 410I also includes a second scale-out controller 411-2 connected between a second channel CHB and third and fourth sub-channels CH21 and CH22. Respective groups of non-volatile memory devices are connected to the first, second, third and fourth sub-channels.

Each one of the first scale-out controller 411-1 and second scale-out controller 411-2 includes a first host interface HIF1, a second host interface HIF2, a first memory interface MIF1, and a second memory interface MIF2, where the first host interface HIF1 and second host interface HIF2 of the first scale-out controller 411-1 are connected to the first channel CHA, and the first host interface HIF1 and second host interface HIF2 of the second scale-out controller 411-2 are connected to the second channel CHB. By connecting both the first and second host interfaces to the same channel in this manner, a fast data processing may be performed by each scale-out controller.

As before, each scale-out controller may be used to independently control data processing operations for each one of the non-volatile memories connected to a particular sub-channel, as well as data processing operations directed to the associated buffer 413.

In FIG. 11, however, only a single host interface (e.g., first host interface HIF1) is connected to a respective one of the plurality of channels. A similar configuration has previously been described in relation to FIG. 6B.

In FIG. 12, respective first and second host interfaces of each scale-out controller (411-1 and 411-2) is connected to a different one of the plurality of channels (e.g., CHA, CHB, CHC and CHD).

Figure 13:
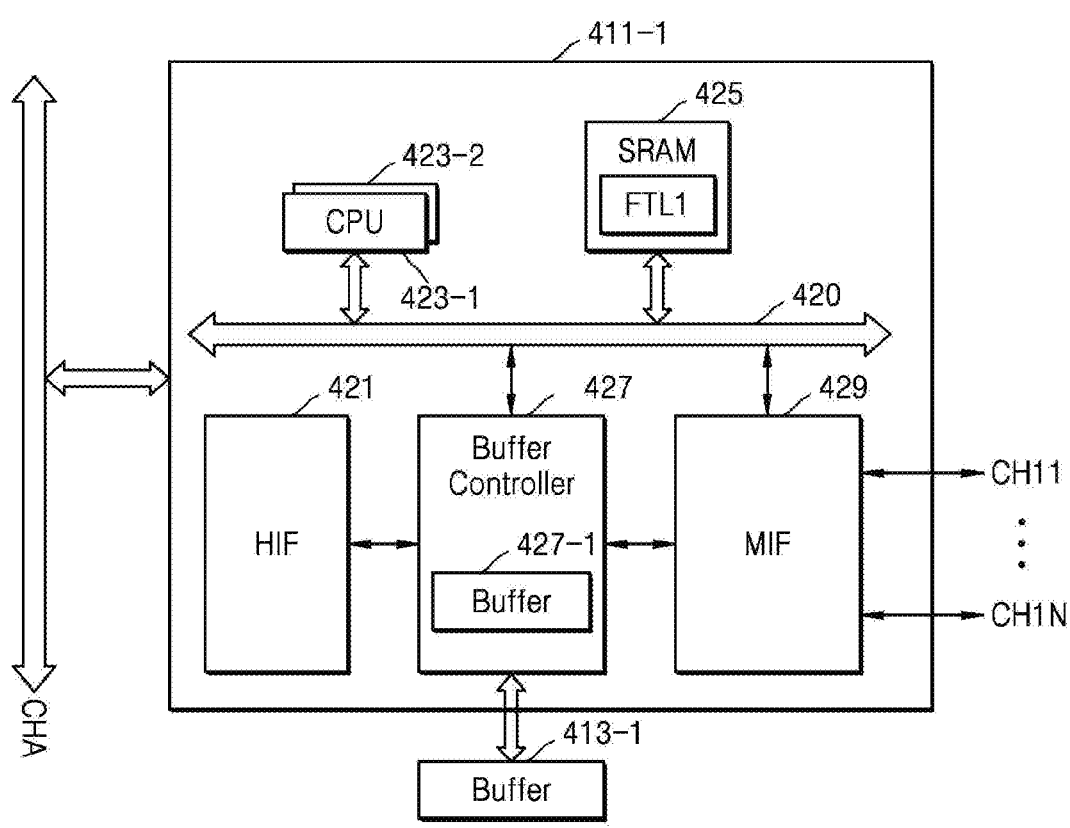
FIG. 13 is a block diagram illustrating the scale-out controller of FIG. 9 according to certain embodiments of the inventive concept.

FIG. 13 is a block diagram further illustrating a scale-out controller 411-1 according to certain embodiments of the inventive concept. Referring collectively to FIG. 1 through FIG. 13, the scale-out controller 411-1 described in relation to FIG. 13 may be used as any one or more of the scale-out controllers previously described. That is, the scale-out controller 411-1 may be used to control the communication of command(s) and/or data between the controller 310, first buffer 413-1, and one or more nonvolatile memories variously connected via one or more sub-channels. The scale-out controller 411-1 may be implemented as a chip, an IC, or a SoC. Where the first buffer 413-1 is implemented as a DRAM, the scale-out controller 411-1 may include a DRAM interface.

The scale-out controller 411-1 of FIG. 13 includes an input terminal (or input port) connected to at least one channel and/or way. The scale-out controller 411-1 of FIG. 13 also includes one or more output terminals (or output ports) respectively connected to one or more of the plurality of channels/ways. The scale-out controller 411-1 of FIG. 13 also includes an interface connected to the first buffer 413-1.

The scale-out controller 411-1 may include a bus structure (or bus) 420, a host interface 421, at least one CPU 423-1 and/or 423-2, an internal memory 425, a buffer controller 427, and a memory interface 429.

The bus structure 420 may be implemented consistent with AMBA, AHB, APB, AXI, ASB, or some combination thereof, but is not limited thereto.

The host interface 421 may be used to change format(s) associated with commands (e.g., requests and responses) and/or data communicated to/from the controller 310 via one or more channels. Accordingly, the host interface 421 may include (or control the operation of) a transceiver.

For example, the host interface 421 may be implemented using a SATA, SATAe, SAS, PCIe, NVMe, AHCI, a NAND-type flash memory system or NOR-type flash memory interface, but is not limited thereto.

The scale-out controller 411-1 may include a plurality of host interfaces 421, and may connect at least one selected from the plurality of host interfaces 421 to the first channel CHA. As shown in FIG. 1, channels connected to the controller 310 may correspond to the plurality of channels CHA to CHN, and the scale-out controller 411-1 may be connected to the plurality of channels CHA to CHN via the plurality of host interfaces 421.

The one or more CPUs 423-1 and/or 423-3 may control the host interface 421, the internal memory 425, the buffer controller 427, and the memory interface 429 via the bus structure 420. Each of the CPUs 423-1 and/or 423-3 may include one or more cores.

For example, the CPU 423-1, i.e., a first CPU, may control an interaction with the third interface 350 illustrated in FIG. 1 via the host interface 421, and the CPU 423-2, i.e., a second CPU, may control an interaction with NAND-type flash memories connected with each sub-channel CH11 to CH1N, via the memory interface 429. According to an embodiment, the first CPU 423-1 and the second CPU 423-2 may form a multi-CPU. According to an embodiment, the first CPU 423-1 may control the second CPU 423-2.

The internal memory 425 may store data necessary for an operation of the scale-out controller 411-1 or data generated by a data processing operation (for, write operation or read operation) performed by a scale-out controller 411-1. The internal memory 425 may store a first FTL code FTL1 that may be executed by the CPU 423-1 and/or 423-2. According to embodiment, the internal memory 425 may be implemented with RAM, DRAM, SRAM, a buffer, a buffer memory, a cache, or a TCM, but is not limited thereto.

The buffer controller 427 may write data to the first buffer 413-1 or read data stored in the first buffer 413-1, according to the control of the first CPU 423-1 or the second CPU 423-2. The buffer controller 427 may be referred to as a controller or a buffer manager which may control a write operation and a read operation with respect to the first buffer 413-1.

The scale-out controller 411-1 may further include an internal buffer 427-1 that is controlled by the buffer controller 427. In FIG. 13, although the internal buffer 427-1 is implemented in the buffer controller 427, the internal buffer 427-1 may be implemented in the scale-out controller. For example, the internal buffer 427-1 may be implemented with SRAM. The first buffer 413-1 may perform the function of an external buffer, and may be implemented with DRAM.

The memory interface 429 may control data processing operations for the NAND-type flash memories NAND via a corresponding one of the plurality of sub-channels CH11 to CH1N, according to the control of the first CPU 423-1 or the second CPU 423-2.

Figure 14:
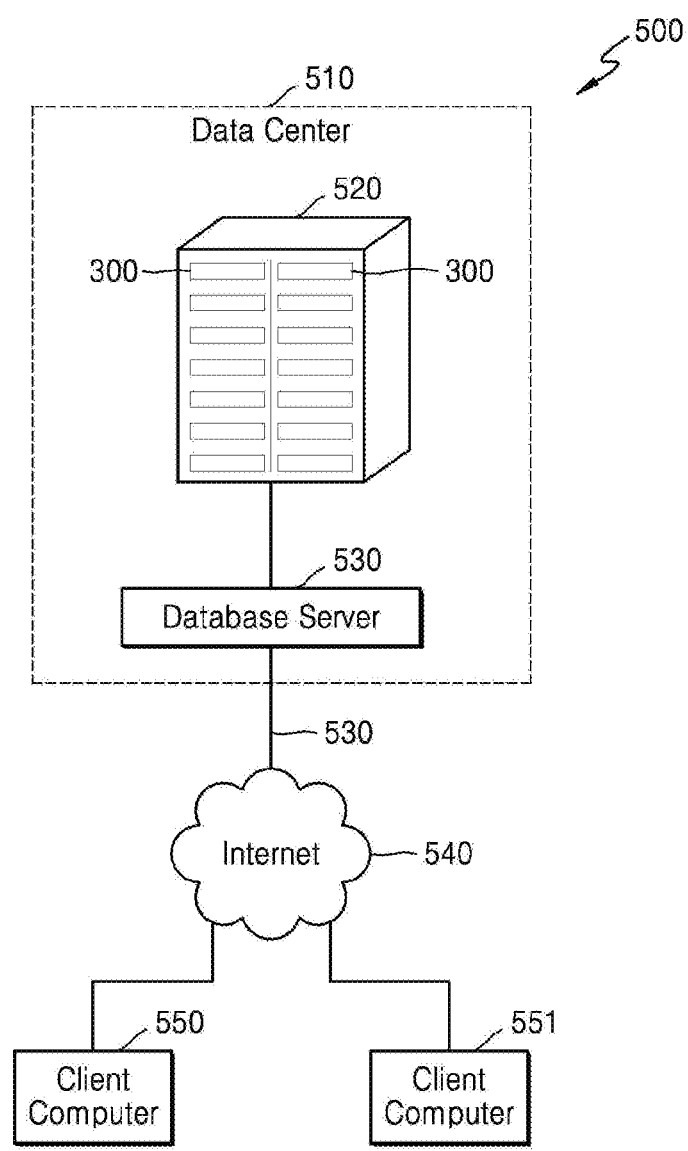
FIG. 14 is a block diagram of a data processing system according to another embodiment of the inventive concept.

FIG. 14 is a block diagram of a data processing system 500 according to another embodiment of the inventive concept.

The data processing system 500 may include a database 520, a database server 530, a second network 540, and a plurality of client computers 550 and 551.

A data center, internet data center, or cloud data center 510 may include the database 520 and the database server 530.

The database 520 may include a plurality of data storage devices 300. The plurality of data storage devices 300 may be installed in a rack. The structure and the operation of each of the data storage devices 300 is the same as or similar to those of the data storage devices 300 described with reference to FIGS. 1 to 12.

The database server 530 may control the operation of each of the data storage devices 300. The database server 530 may connected to the second network 540, e.g., an Internet, via a first network, e.g., a local area network (LAN) 535. For example, the database server 530 may be implemented with a web server or a mail server, but is not limited thereto.

Each of the plurality of client computers 550 and 551 may be connected to the database server 530 via the second network 540.

While the inventive concept has been particularly shown and described with reference to embodiment thereof, it will be understood that various changes in form and details may be made therein without departing from the scope of the following claims.

What is claimed is:

1. A data storage device, comprising:
a controller;
a plurality of clusters; and
a plurality of channels, each of the channels connecting the controller to one of the plurality of clusters,
wherein each of the clusters comprises:
a scale-out device including a scale-out controller and a buffer,
a plurality of non-volatile memory (NVM) devices, and
a plurality of sub-channels, each one of the plurality of sub-channels connecting a group of two or more of the non-volatile memory (NVM) devices to the scale-out controller, such that the scale-out controller controls execution of data processing operations directed to any one of the two or more NVM devices of the group and further controls execution of data processing operations directed to the buffer, wherein the scale-out controller is connected to at least one of the plurality of channels by a plurality of data paths between the scale-out controller and the at least one channel, and wherein the scale-out controller includes:
- a first host interface (HIF1) connected to the at least one channel by a first one of the plurality of data paths, and
- a second host interface (HIF2) connected to the at least one channel by a second one of the plurality of data paths.

2. The data storage device of claim 1, wherein the controller comprises a first central processing unit (CPU) configured to execute first flash translation layer (FTL) code, the plurality of clusters includes a first cluster including a first scale-out controller and a first buffer, the first scale-out controller being connected to a first sub-channel connecting a first group of NVM devices and a second sub-channel connecting a second group of NVM devices;

the first scale-out controller comprising a second CPU configured to execute second FTL code different from the first FTL code, and the first buffer storing a logical address-to-physical address mapping table for at least one of the first group of NVM devices and second group of NVM devices.

3. The data storage device of claim 2, wherein the first scale-out controller further comprises:
- a first memory interface (MIF1) connected to the first sub-channel; and
- a second memory interface (MIF2) connected to the second sub-channel.

4. The data storage device of claim 3, wherein the first group of NVM devices is controlled by a first command/data received via the HIF1 and the second group of NVM devices is controlled by a second command/data different from the first command/data.

5. The data storage device of claim 3, wherein the second command/data is received via at least one of the HIF1 and HIF2.

6. The data storage device of claim 3, wherein the MIF1 operates in response to command/data received via only the HIF1, and the MIF2 operates in response to command/data received via only the HIF2.

7. The data storage device of claim 3, wherein the MIF1 and MIF2 operate in response to command/data received via the HIF1, and the HIF2 is not connected to any one of the plurality of sub-channels.

8. A data processing system, comprising:
a data storage device, comprising:
- a controller;
- a plurality of clusters; and
- a plurality of channels, each of the channels connecting the controller to one of the plurality of clusters, wherein each of the clusters comprises:
- a scale-out device including a scale-out controller and a buffer,
- a plurality of non-volatile memory (NVM) devices, and
- a plurality of sub-channels, each one of the plurality of sub-channels connecting a group of two or more of the non-volatile memory (NVM) devices to the scale-out controller, such that the scale-out controller controls execution of data processing operations directed to any one of the two or more NVM devices of the group and further controls execution of data processing operations directed to the buffer, wherein the scale-out controller is connected to at least one of the plurality of channels by a plurality of data paths between the scale-out controller and the at least one channel, and wherein the scale-out controller includes:
- a first host interface (HIF1) connected to the at least one channel by a first one of the plurality of data paths, and
- a second host interface (HIF2) connected to the at least one channel by a second one of the plurality of data paths; and a host controlling the operation of the data storage device.

9. The data processing system of claim 8, wherein the host comprises a first interface and the data storage device comprises a second interface and a third interface, the first and second interfaces implement at least one of a serial advanced technology attachment (SATA) interface, SATA express (SATAe) interface, serial attached small computer system interface (SAS), peripheral component interconnect express (PCIe) interface, non-volatile memory express (NVMe) interface, and advanced host controller interface (AHCI).

10. The data processing system of claim 9, wherein during a write operation requested by the host, the external buffer receives and temporarily stores write data, and during a read operation requested by the host the external buffer receives and temporarily stores read data, the third interface implements an interface compatible with at least one of SATA, SATAe, SAS, PCIe, NVMe, AHCI, a NAND-type flash memory system and a NOR-type flash memory system.

11. The data processing system of claim 10, wherein the third interface comprises an error detection/correction code (ECC) engine.

12. The data processing system of claim 8, wherein the controller of the data storage device comprises a first central processing unit (CPU) configured to execute first flash translation layer (FTL) code, the plurality of clusters includes a first cluster including a first scale-out controller and a first buffer, the first scale-out controller being connected to a first sub-channel connecting a first group of NVM devices and a second sub-channel connecting a second group of NVM devices; the first scale-out controller comprising a second CPU configured to execute second FTL code different from the first FTL code, and the first buffer storing a logical address-to-physical address mapping table for at least one of the first group of NVM devices and second group of NVM devices.

13. The data processing system of claim 12, wherein the first scale-out controller further comprises:
- a first memory interface (MIF1) connected to the first sub-channel; and
- a second memory interface (MIF2) connected to a second sub-channel.

14. The data processing system of claim 12, wherein the first group of NVM devices is controlled by a first command/data received via the HIF1 and the second group of NVM devices is controlled by a second command/data different from the first command/data, and the second command/data is received via at least one of the HIF1 and HIF2.

15. A data storage device, comprising:
a controller;
a first cluster;

a second cluster;
a plurality of channels connecting the controller to the first cluster and further connected the controller to the second cluster,
wherein the first cluster comprises:
   a first scale-out device including a first scale-out controller and a first buffer,
   a first group of two or more non-volatile memory (NVM) devices,
   a first sub-channel connecting the first scale-out controller to the first group of two or more NVM devices,
   a second group of two or more NVM devices, and
   a second sub-channel connecting the first scale-out controller to the first group of two or more NVM devices,
   wherein the first scale-out controller is connected to at least one of the plurality of channels by a first plurality of data paths between the first scale-out controller and the at least one channel, and
   wherein the first scale-out controller controls execution of data processing operations directed to any one of the NVM devices of the first and second groups connected by the first and second sub-channels and the first buffer, and
wherein the second cluster comprises:
   a second scale-out device including a second scale-out controller and a second buffer,
   a third group of two or more non-volatile memory (NVM) devices,
   a third sub-channel connecting the first scale-out controller to the first group of two or more NVM1 devices,
   a fourth group of two or more NVM devices, and
   a fourth sub-channel connecting the first scale-out controller to the first group of two or more NVM devices,
   wherein the second scale-out controller is connected to at least one of the plurality of channels by a second plurality of data paths between the second scale-out controller and the at least one channel, and
   wherein the second scale-out controller controls execution of data processing operations directed to any one of the NVM devices of the third and fourth groups connected by the third and fourth sub-channels and the second buffer, and
wherein the first scale-out controller and the second scale-out controller each include:
   a first host interface (HIF1) connected to the at least one channel by a first one of the data paths, and
   a second host interface (HIF2) connected to the at least one channel by a second one of the data paths.

16. The data storage device of claim 15, wherein
the first and second host interfaces are connected to a first channel among the plurality of channels, and the third and fourth host interfaces being connected to a second channel among the plurality of channels different from the first channel.

17. The data storage device of claim 15, wherein
the first host interface of the first scale-out controller is connected to a first channel among the plurality of channels,
the second host interface of the first scale-out controller is connected to a second channel among the plurality of channels different from the first channel,
the first host interface of the second scale-out controller is connected to a third channel among the plurality of channels different from the first channel and second channel, and
the second host interface of the second scale-out controller is connected to a fourth channel among the plurality of channels different from the first channel, second channel and third channel.

18. The data storage device of claim 17, wherein the first scale-out controller further comprises a first memory interface (MIF1) connected to the first sub-channel and a second memory interface (MIF2) connected to a second sub-channel, and wherein the MIF1 and MIF2 operate in response to command/data received via the first host interface, and the second host interface is not connected to any sub-channels of the data storage device.

* * * * *